Aug. 2, 1938.  M. G. CARLISLE  2,125,766
PISTON RING EXPANDER
Filed April 10, 1937

Maynard G. Carlisle
INVENTOR

BY Victor J. Evans & Co.
ATTORNEYS

R. E. Wise.
WITNESS

Patented Aug. 2, 1938

2,125,766

UNITED STATES PATENT OFFICE 2,125,766

PISTON RING EXPANDER

Maynard G. Carlisle, Manchester Center, Vt.

Application April 10, 1937, Serial No. 136,233

3 Claims. (Cl. 309—43)

The object of the invention is to provide a device for use in connection with the piston rings of internal combustion engines to not only expand the ring into firm contact with the cylinder wall but likewise to preclude leakage around the piston ring groove; to provide a piston ring expander which, when mounted, will not change its position relative to the ring, so that the splits in the expander and ring may be precluded from registering and thereby permit leakage; and to provide a device of the kind indicated which is of simple form and therefore susceptible of cheap manufacture.

With this object in view, the invention consists in a construction and combination of parts of which a preferred embodiment is illustrated in the accompanying drawing, wherein.

Figure 1:
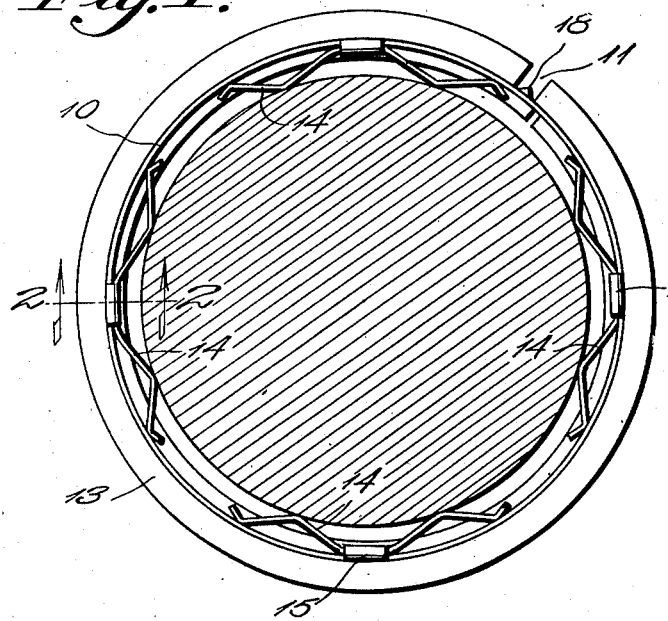
Figure 1 is a cross sectional view of a piston in the plane of the upper edge of the groove, showing the ring and the expander of the invention in top plan.
Figure 2:
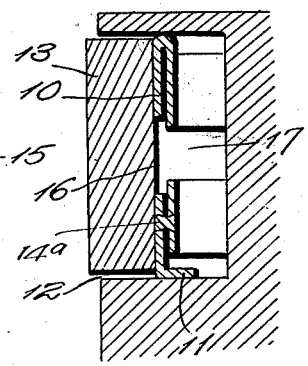
Figure 2 is a sectional view on the plane indicated by the line 2—2 of Figure 1.
Figure 3:
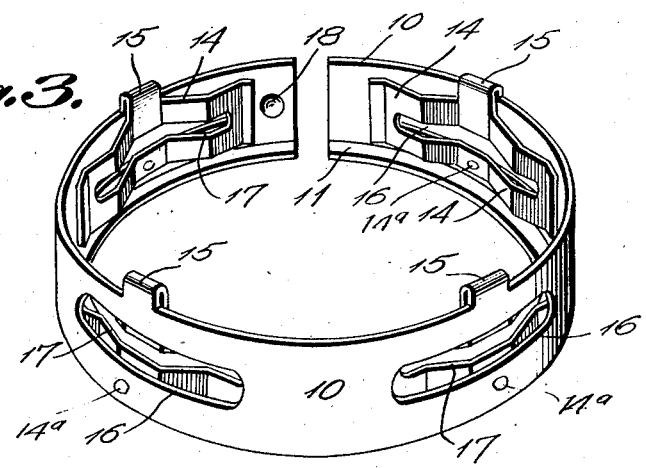
Figure 3 is a perspective view illustrating the expander.

The expander is in the form of an annular member made of sheet metal turned angularly at one of its longitudinal edges before being bent into annular or ring form, so that there is provided a split ring 10 with an inturned annular flange 11. In the use of the device, preferably this flange is at the lower edge of the piston ring groove 12, as indicated in Figure 2, although the device may be used in inverted position under certain conditions. As an expander, the ring is not relied upon to spread or radially expand the piston ring 13, but is provided with presser springs 14, each of which is generally arcuate with the peak of the arch bearing in the bottom of the piston ring groove and the extremities of the legs bearing against the back face of the ring 10. The presser springs are arranged in pairs and are formed as integral parts of the tongues 15, the tongues being integral extensions of the ring 10 formed at the upper edge of the latter and being bent over and downwardly to lie against the rear face of the ring. The springs besides being suspended from the tongues are spot welded to the ring, as indicated at 14a.

The presser spring units each consists of a pair of presser springs and its connected tongue and there are a plurality of such units distributed around the body portion of the ring 10 on the rear face thereof, but the ring is slotted, as indicated at 16, in the region of each unit and the tongue of each is formed with an opening 17 directly behind the slot 16.

The body portion of the ring is upset, as indicated at 18, to provide a projecting bulge or protuberance which protrudes into the space between the ends of the piston ring 13, so that there can be no relative angular or turning movement between the expander ring and the piston ring.

In use, the preferable manner of mounting is with the flange 11 on the lower edge of the piston ring groove and this flange is kept in firm contact with the bottom wall of the groove by the arched portions of the tongues 15, the slots 16 providing for slight compression of the expander ring in the direction of its width. These slots also serve as oil passages when the inner ring is used inside of regular oil rings but in case of such use, the expander ring is preferably positioned with the flange 10 against the upper face of the piston ring groove. The holes or perforations 17 function as vents.

The invention having been described, what is claimed as new and useful is:

1. A device for the purpose indicated comprising a ring member formed with an inturned annular flange at one edge and tongues at the opposite edge bent over and down against the back face of the ring member and terminating in presser springs, the tongues at the bent over portions extending above the edge of the ring member for contact with a flat face of a piston ring groove to force the flange into contact with the other flat face of said groove, the ring member being formed with circumferential slots directly in front of the presser springs.

2. A device for the purpose indicated comprising a ring member formed with an inturned annular flange at one edge and tongues at the opposite edge bent over and down against the back face of the ring member and terminating in presser springs, the tongues at the bent over portions extending above the edge of the ring member for contact with a flat face of a piston ring groove to force the flange into contact with the other flat face of said groove the ring member being formed with circumferential slots directly in front of the presser springs, the presser springs being arranged in pairs with the units of each pair on opposite sides of but integrally connected with the tongues.

3. A device for the purpose indicated comprising a ring member formed with an inturned annular flange at one edge and tongues at the opposite edge bent over and down against the back face of the ring member and terminating in presser springs, the ring member being formed with circumferential slots directly in front of the presser springs, the presser springs being arranged in pairs with the units of each pair on opposite sides of but integrally connected with the tongues, and the latter having vent openings therein.

MAYNARD G. CARLISLE.